No. 746,523. PATENTED DEC. 8, 1903.
M. C. KELLEY & W. P. TERRELL.
INSECT DESTROYING MACHINE.
APPLICATION FILED JUNE 1, 1903.
NO MODEL. 2 SHEETS—SHEET 1.
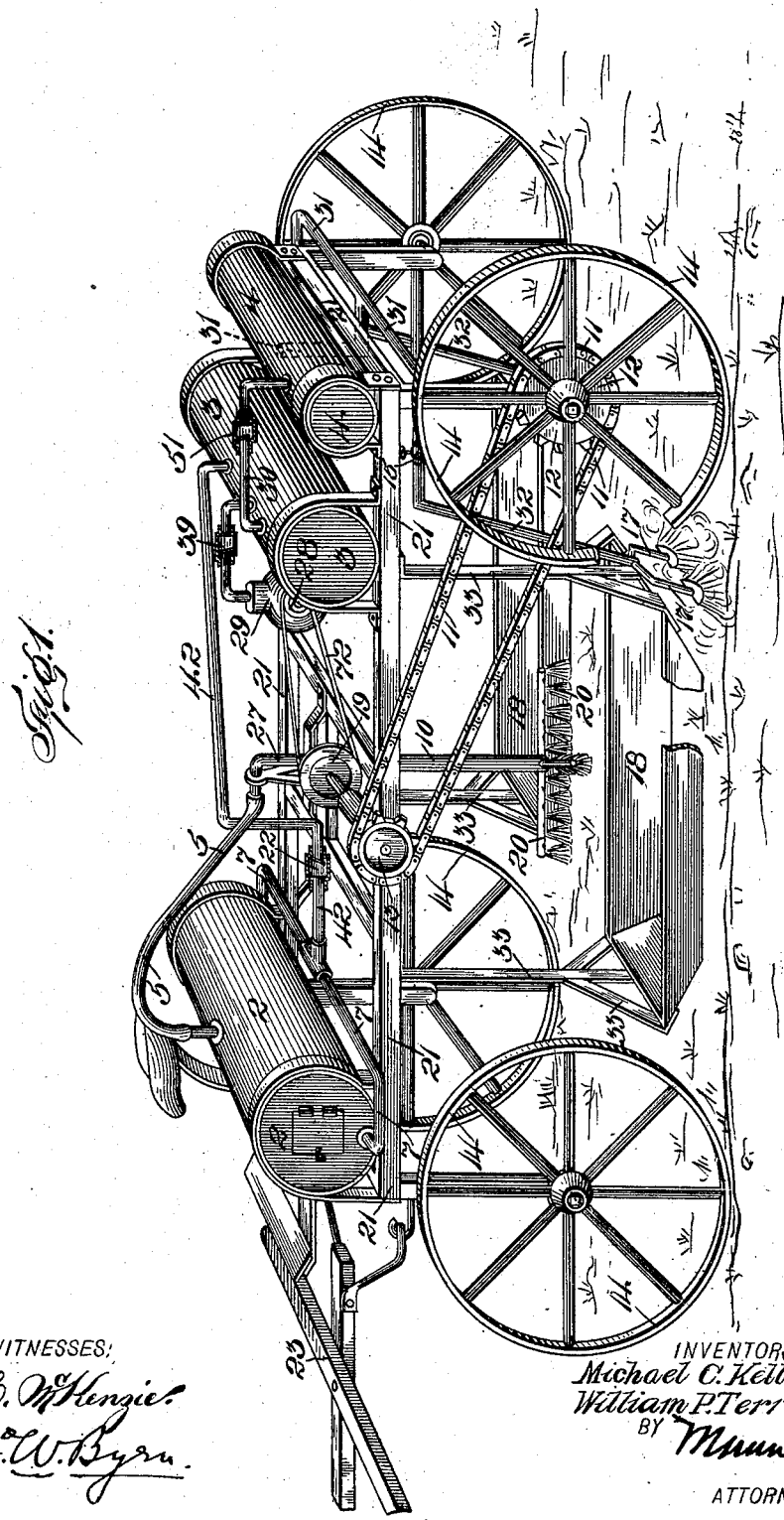
WITNESSES:
Wm. C. McKenzie
Edw. W. Byrn
INVENTORS
Michael C. Kelley.
William P. Terrell.
BY Munn & Co.
ATTORNEYS.

No. 746,523. PATENTED DEC. 8, 1903.
M. C. KELLEY & W. P. TERRELL.
INSECT DESTROYING MACHINE.
APPLICATION FILED JUNE 1, 1903.
NO MODEL. 2 SHEETS—SHEET 2.
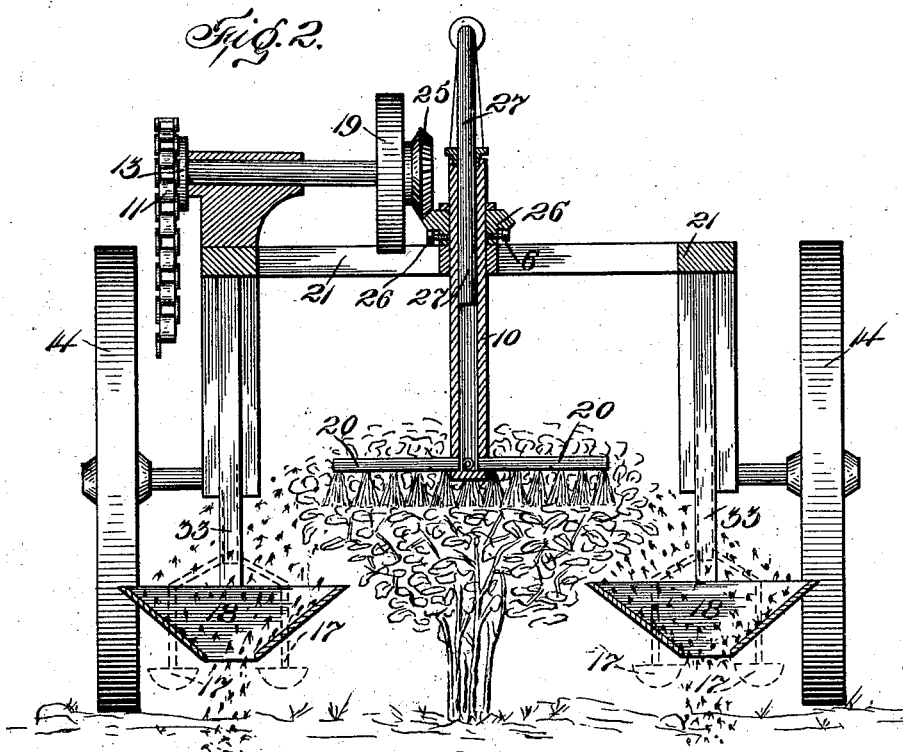
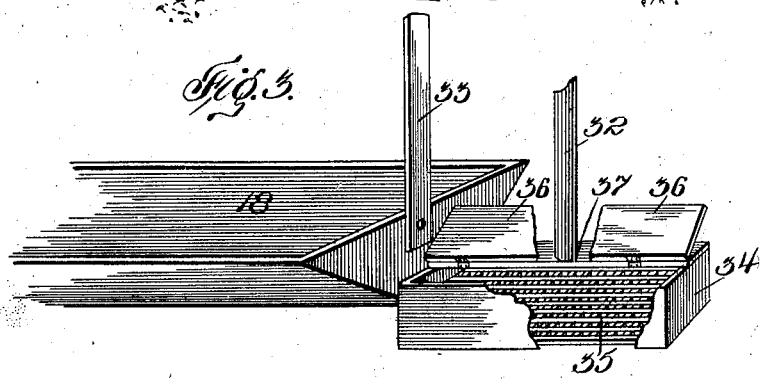

No. 746,523.

Patented December 8, 1903.

UNITED STATES PATENT OFFICE.

MICHAEL C. KELLEY AND WILLIAM P. TERRELL, OF CONROE, TEXAS.

INSECT-DESTROYING MACHINE.

SPECIFICATION forming part of Letters Patent No. 746,523, dated December 8, 1903.

Application filed June 1, 1903. Serial No. 159,632. (No model.)

*To all whom it may concern:*

Be it known that we, MICHAEL C. KELLEY and WILLIAM P. TERRELL, of Conroe, in the county of Montgomery and State of Texas, have invented a new and useful Improvement in Insect-Destroying Machines, of which the following is a specification.

Our invention is in the nature of a novel construction and arrangement of machine for removing insects from plants and absolutely destroying them by fire without injury to the plants. It is applicable to and intended to be used for destroying insects on all sorts and sizes of plants, but is especially designed for the destruction of the boll-weevil of the cotton-plant.

It comprehends certain new and useful devices for dislodging the insects from the plants, gathering them together or assembling them as they fall in a row or line of narrow width upon the ground, and following up and burning them by a burner directed upon the concentrated stream or row of insects upon the ground without injury to the plants.

It also comprises means for simultaneously fumigating the plants by a discharge of noxious gases directed centrally through the same brush or agitator which dislodges the insects from the plants, as will be hereinafter more fully described with reference to the drawings, in which—

Figure 1 is a perspective view of the entire machine. Fig. 2 is a transverse vertical section through the dislodging-brush and gathering-troughs. Fig. 3 is a modification of the burner, in which coal or solid fuel may be used instead of gasolene.

In the drawings, Fig. 1, 14 14 14 14 are four supporting-wheels connected in pairs, the front pair being connected by one crank-axle and the rear pair by another crank-axle. Upon the elevated portions of these crank-axles is sustained a rectangular frame 21, which bears a fumigating-chamber 2, an air-receiver 3, and a gasolene-tank 4, the same being preferably constructed as horizontal cylinders of suitable size disposed transversely on top of the framework 21, and the whole being adapted to be drawn across the field over the row of plants by means of the usual double-team draft attachments and tongue 23. The fumigating-chamber 2 is designed to contain burning sulfur or other fuel capable of evolving a gas noxious to insects. It is burned in the chamber by a blast of air introduced through the pipe 7, which enters both ends of the chamber at the bottom and in the middle has a T-coupling that connects with a pipe 42, that extends to the air-receiver, in which compressed air is stored up from an air pump or blower, as hereinafter described. The pipe 42 has a check-valve 22 in it opening outwardly from the air-receiver. From the top of the fumigator-chamber a flexible hose-pipe 5 leads the fumes of sulfur to the top of a hollow vertical brush-shaft 10, bearing on its lower end a horizontal brush-wheel or agitator 20, through which the hollow shaft opens at the bottom. This brush-wheel occupies a position immediately above and in the midst of the foliage of the plants and as it is revolved it dislodges the insects, which are collected and destroyed, as hereinafter described. At the same time that it dislodges the insects the sulfur-vapors are disseminated through the hollow perforated arms of the wheel into the branches and leaves, said vapors passing in a continuous stream from the fumigating-chamber through the hollow shaft of the brush and down into the plants, being thoroughly and uniformly distributed by centrifugal action as it issues into the branches of the plant. To accommodate the varying height of the plant, this brush and fumigator-wheel is made vertically adjustable and is driven as follows:

On one of the hind wheels of the machine there is fastened a sprocket-wheel 12, and this by a chain belt 11 turns another sprocket-wheel 13 on a counter-shaft arranged transversely on the main frame. This counter-shaft has on its inner end a bevel-gear 25, which engages a bevel-gear 26. The hub of this bevel-gear 26 (see Fig. 2) has set-screws 6 tapped through it, which rigidly connect it to the hollow vertically-adjustable shaft 10 of the brush. In the upper end of this hollow shaft there slides telescopically a metal pipe 27, connecting with the hose-pipe leading from the fumigator. The bevel-gear 26 occupies a constant plane; but when the set-screws 6 are loosened the brush-shaft 10 may be passed freely through the hub of said bevel-gear to any desired adjustment and is there fixed again by tightening the set-screws 6. The telescopic joint at the top of the hollow shaft maintains the connection with the fumigator-chamber during this adjustment and also allows the hollow shaft and bevel-gear to turn freely around the inner pipe. Near the inner end of the counter-shaft there is another driving-wheel 19, constructed as a pulley to receive a belt 72, which communicates motion to a pulley 28 of a rotary pump or blower 29, which through a check-valve 39 stores up compressed air in the chamber 3. This air-chamber not only supplies air to the fumigator-chamber, as described, but also furnishes air to the gasolene-tank 4 through the pipe 30 and check-valve 51, so as to form a combustible gas with the gasolene therein to supply the burners, which I will now describe. The hydrocarbon vapors which supply the blaze for the destruction of the insects issue from the pipe 31, which extends on each side of the machine to a cut-off valve 15 and from this point extends down a pipe 32 to double burners 17 17 on each side of the machine. The nozzles of these burners are directed upon the ground, and the insects as brushed off the plant are deposited in a narrow stream or row in a line in front of and immediately between the two nozzles of the twin burner. To gather or collect the insects and deposit them in this narrow row, an open-bottom trough, chute, or hopper 18 is arranged longitudinally with the machine in front of each burner and is supported by hanger-bars 33 from the main frame 21. These open-bottom troughs are arranged one on each side of the brush-wheel 20, so that the insects dislodged thereby will fall into the trough and be directed thereby through its slotted bottom onto the ground. The air from the air-receiver 3 entering the gasolene-tank 4 mingles with its gases and, forming a combustible mixture, issues at the burners 17 17, and when ignited the blaze from each burner is directed upon and destroys the stream of insects upon the ground before they have time to fly or crawl away.

In making use of our invention we do not confine ourselves to a gasolene-burner, but may use a grate suspended by the hanger-bars or hopper, which grate is adapted to receive coal or other solid fuel. Such a form of grate is shown in Fig. 3. This burner is supported upon the rear end of each hopper and consists of a pan 34 about twelve inches wide and two feet long, having a grating 35 in the bottom covering the whole space of the bottom, and a top having in one portion holes 37 to receive the air-supply pipe and having the other portion 36 hinged and provided with suitable fastening devices to permit the insertion of the fuel. The blast of air forces the flame through the grated bottom onto the insects below to destroy them in the same manner as the gasolene-burner.

We are aware that insects have been dislodged and carried away in a receptacle and that they have also been burned on the ground by a burner; but we do not know that they have been concentrated by an open-bottom trough into a row on the ground at some distance from the plants, so as to permit effective and complete destruction without injury to the plants.

Having thus described our invention, what we claim as new, and desire to secure by Letters Patent, is—

1. In an insect-destroyer, the combination with a burner, and a dislodging device for beating the insects from the plants; of an interposed open-bottom trough or chute to concentrate the falling insects into a row on the ground in front of the burner substantially as described.

2. In an insect-destroyer, the combination of a vertical rotary hollow shaft bearing at its lower end a rotary agitator, and a fumigating apparatus having a discharge-pipe connecting with the hollow shaft and discharging its gases through the rotary agitator substantially as described.

3. In an insect-destroyer, the combination of a vertical rotary hollow shaft bearing at its lower end a rotary agitator, means for adjusting said shaft and agitator vertically, and a fumigating device having its discharge-pipe connected with the hollow shaft substantially as and for the purpose described.

4. In an insect-destroyer, the combination of a vertical rotary hollow shaft bearing at its lower end a rotary agitator, means for adjusting the shaft and agitator vertically, a fumigator and a connecting-pipe having a telescopic sliding joint with the hollow shaft substantially as and for the purpose described.

5. An insect-destroyer comprising a fumigator-chamber, a compressed-air receiver, and a gasolene-tank, pipes leading from the air-receiver to the fumigator and to the gasolene-tank, a vertical rotary hollow shaft bearing at its lower end an agitator, a pipe connecting said fumigator with the hollow shaft, a burner with pipe connected to the gasolene-tank, an air-compressor connected to the air-receiver, and means for driving the rotary agitator and the air-compressor from the running-gear of the machine substantially as described.

6. In an insect-destroyer, the combination with the running wheels; of a driving-gear, an air-receiver, an air-compressor operated by said driving-gear, a burner, and a rotary agitator also connected to and operated by the driving-gear substantially as described.

MICHAEL C. KELLEY.
WILLIAM P. TERRELL.

Witnesses:
JACOB H. MOODY,
E. J. MINNOCK.